United States Patent [19]
Robb

[11] Patent Number: 5,453,878
[45] Date of Patent: Sep. 26, 1995

[54] LASER BEAM EXPANDERS WITH PLASTIC AND LIQUID LENS ELEMENTS

[75] Inventor: Paul N. Robb, Santa Clara, Calif.

[73] Assignee: Lockheed Missiles & Space Company, Inc., Sunnyvale, Calif.

[21] Appl. No.: 283,786

[22] Filed: Aug. 1, 1994

Related U.S. Application Data

[62] Division of Ser. No. 11,551, Feb. 1, 1993, Pat. No. 5,373,396.

[51] Int. Cl.⁶ ............................ G02B 1/06; G02B 3/12
[52] U.S. Cl. .......................................................... 359/665
[58] Field of Search ...................... 359/665, 666, 359/667

[56] References Cited

U.S. PATENT DOCUMENTS

| | | | |
|---|---|---|---|
| 4,526,711 | 7/1985 | Sacher et al. | 359/665 |
| 4,913,535 | 4/1990 | Robb | 359/665 X |
| 4,950,041 | 8/1990 | Robb | 359/665 |
| 4,966,448 | 10/1990 | Robb | 359/665 |
| 5,345,337 | 9/1994 | Sigler | 359/665 |

*Primary Examiner*—Edward K. Look
*Assistant Examiner*—Michael S. Lee
*Attorney, Agent, or Firm*—John J. Morrissey; J. P. Violette; Edward J. Radlo

[57] ABSTRACT

Design forms are disclosed for 5X and 10X laser beam expanders whose lens elements consist only of plastic and liquid optical materials, which provide diffraction-limited performance without refocussing over a wavelength range from 0.4 micron to 0.8 micron.

18 Claims, 12 Drawing Sheets

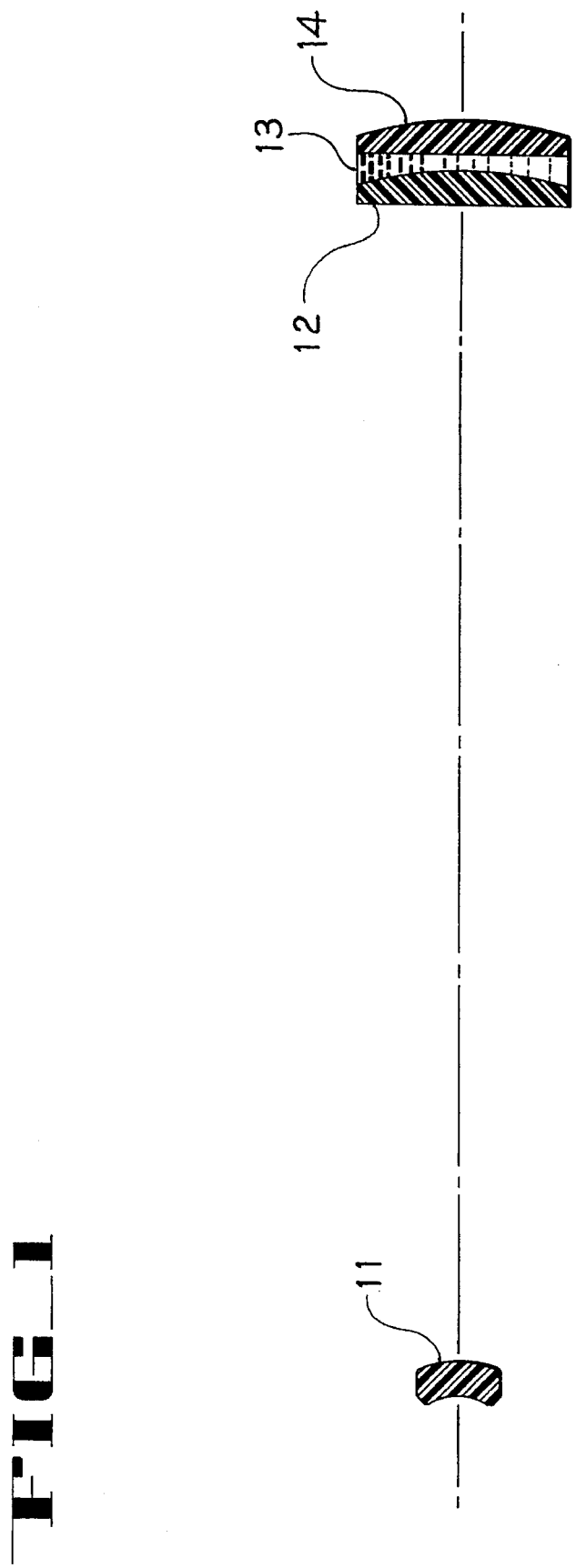

FIG_2
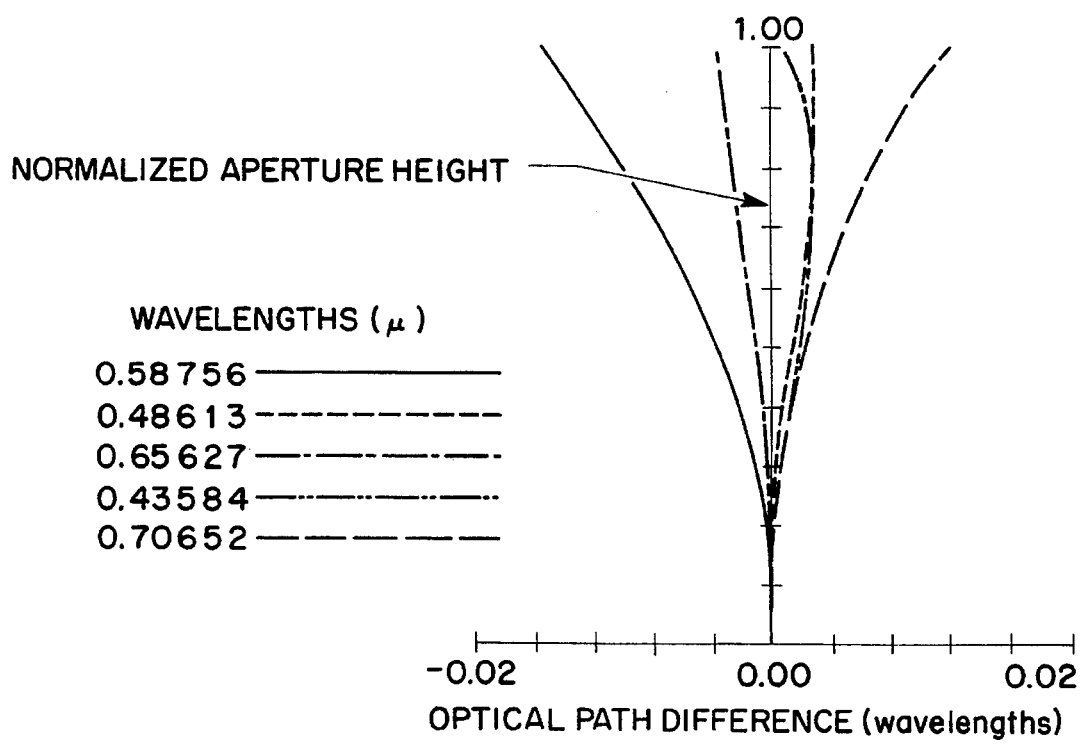
FIG_3
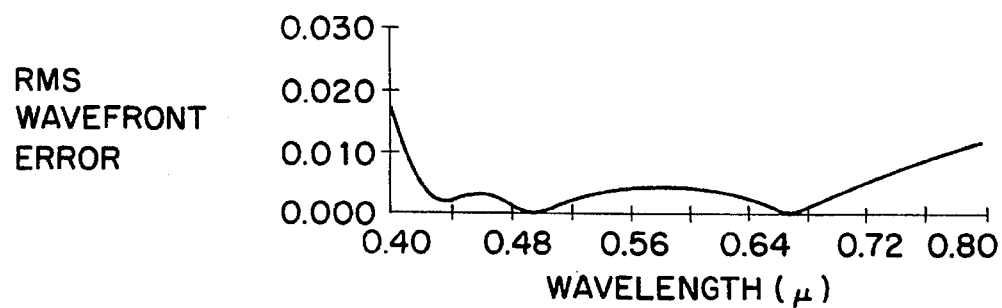

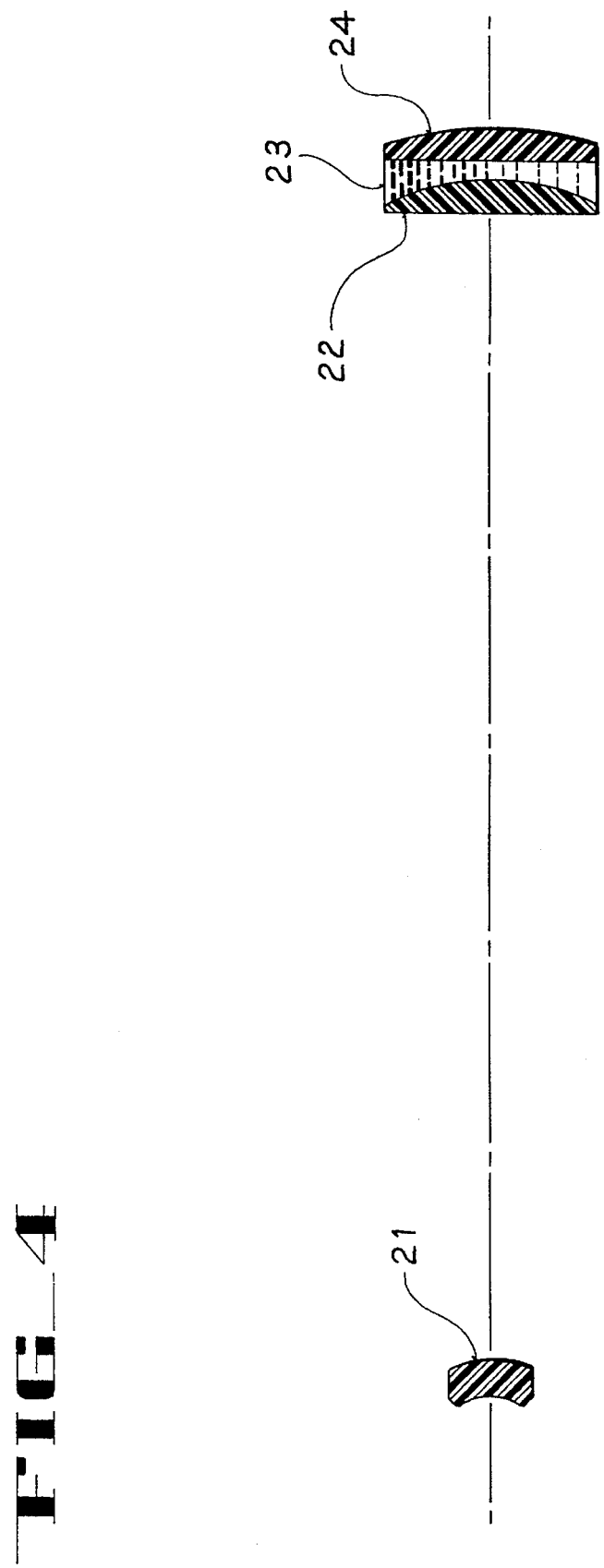

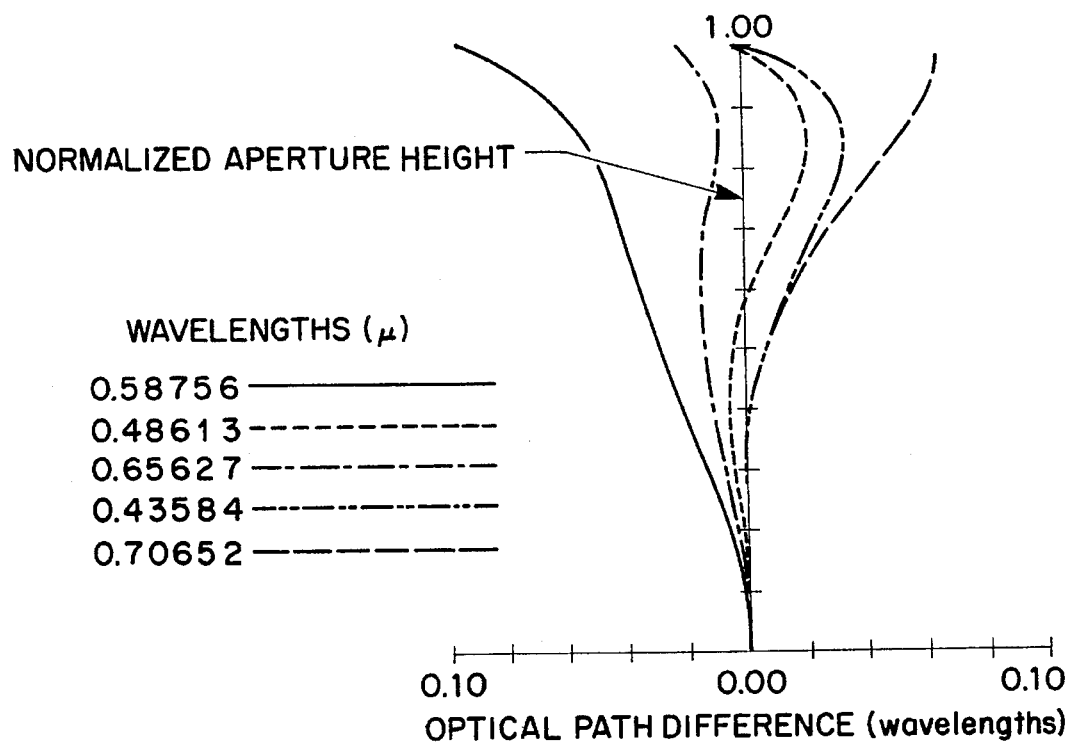
FIG_5
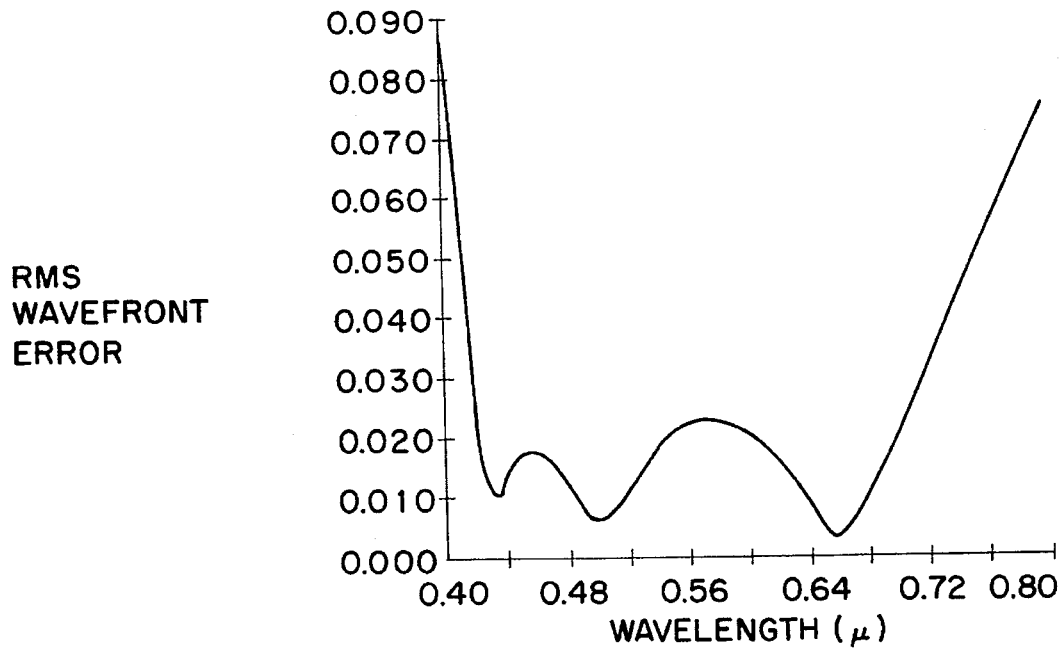
FIG_6

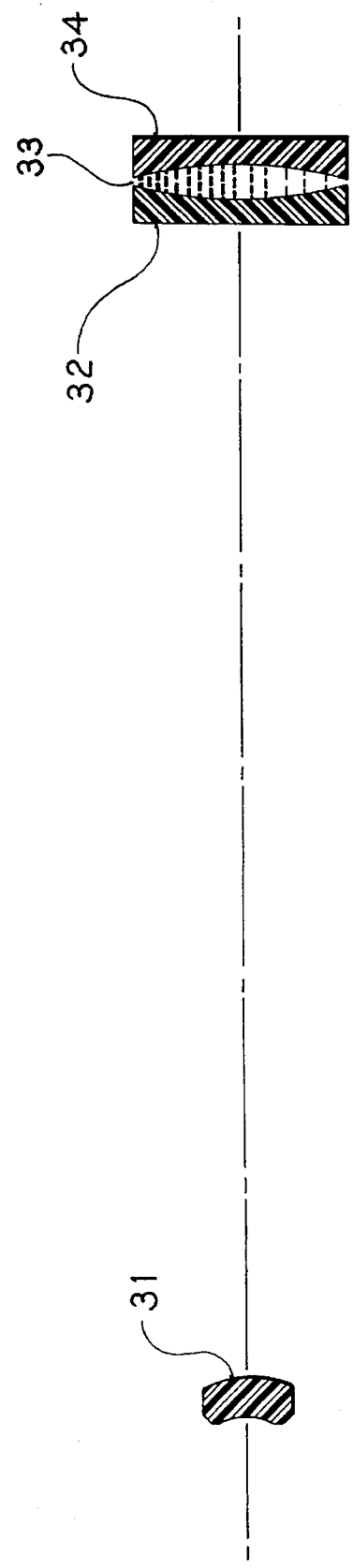

FIG_8
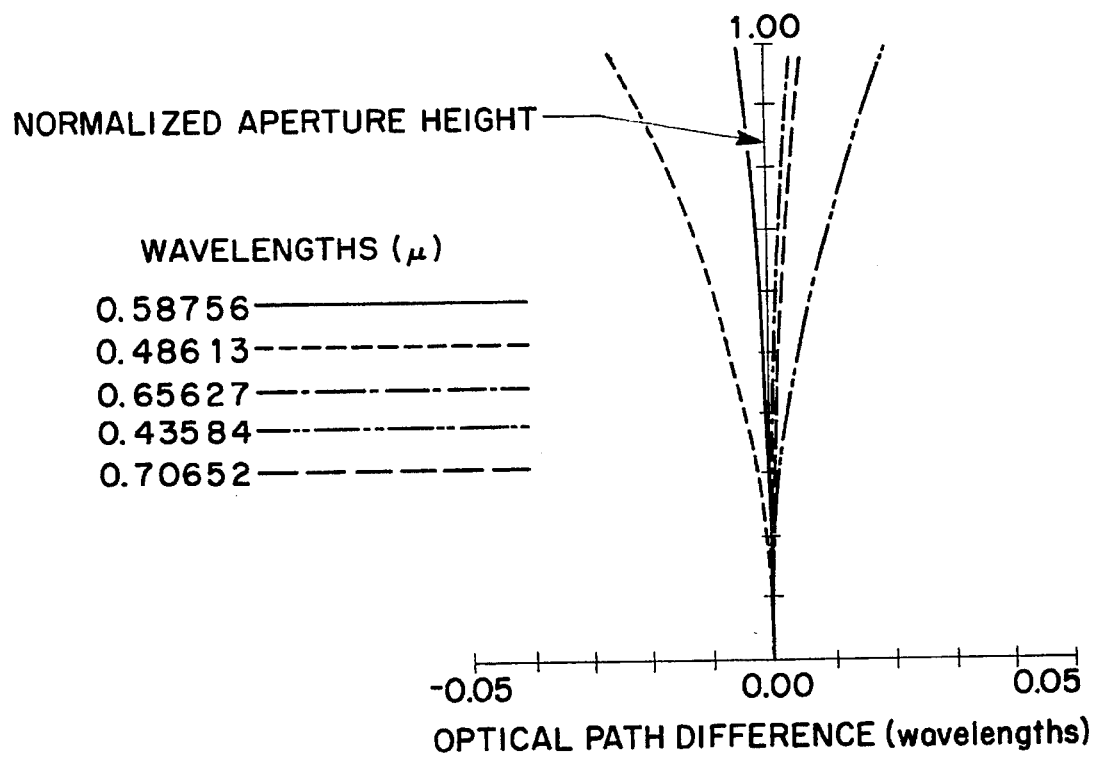
FIG_9
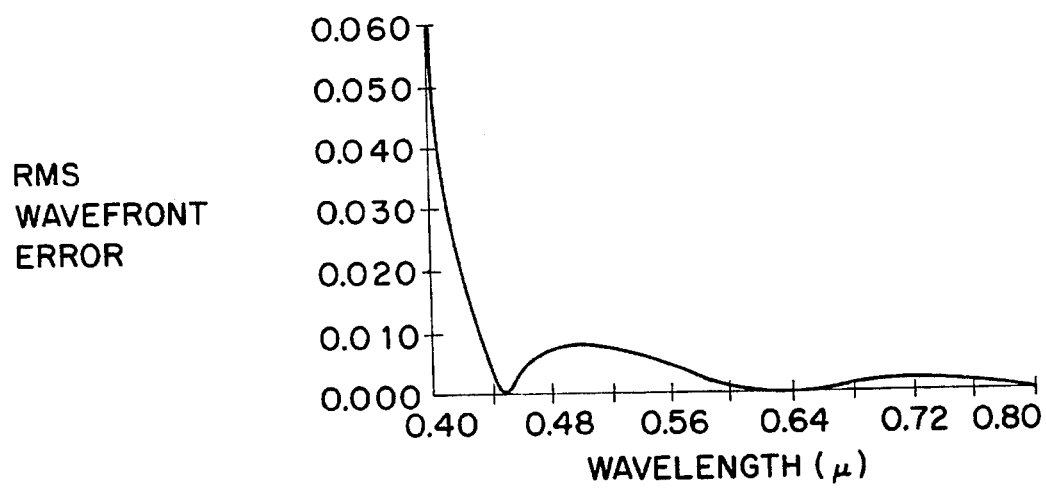

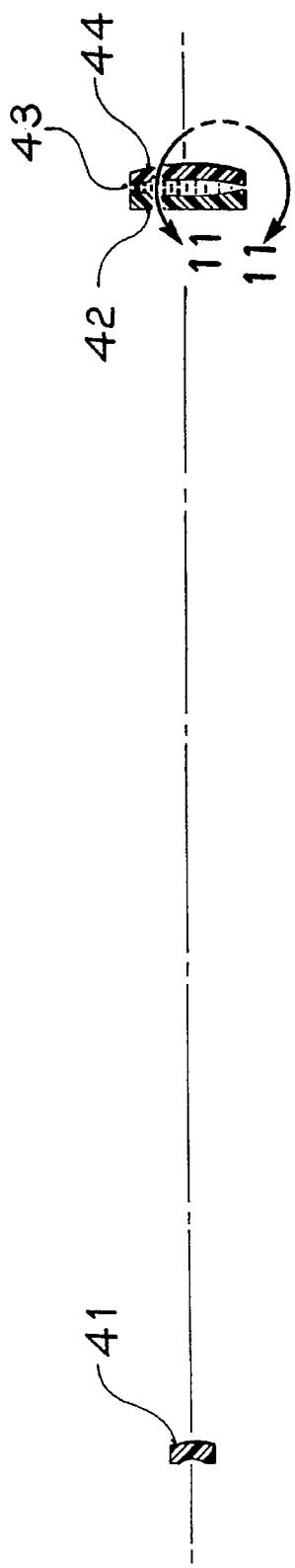
FIG_10
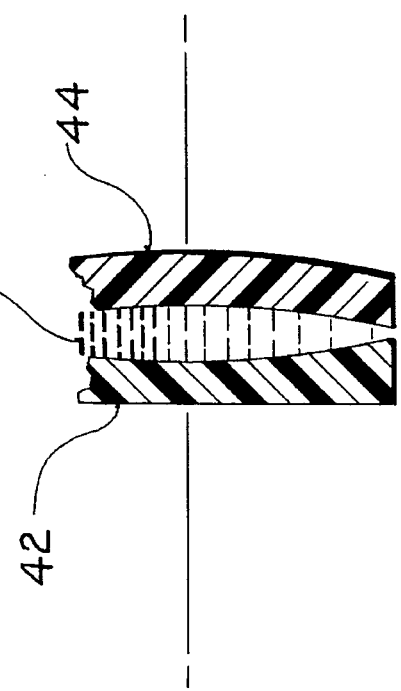
FIG_11

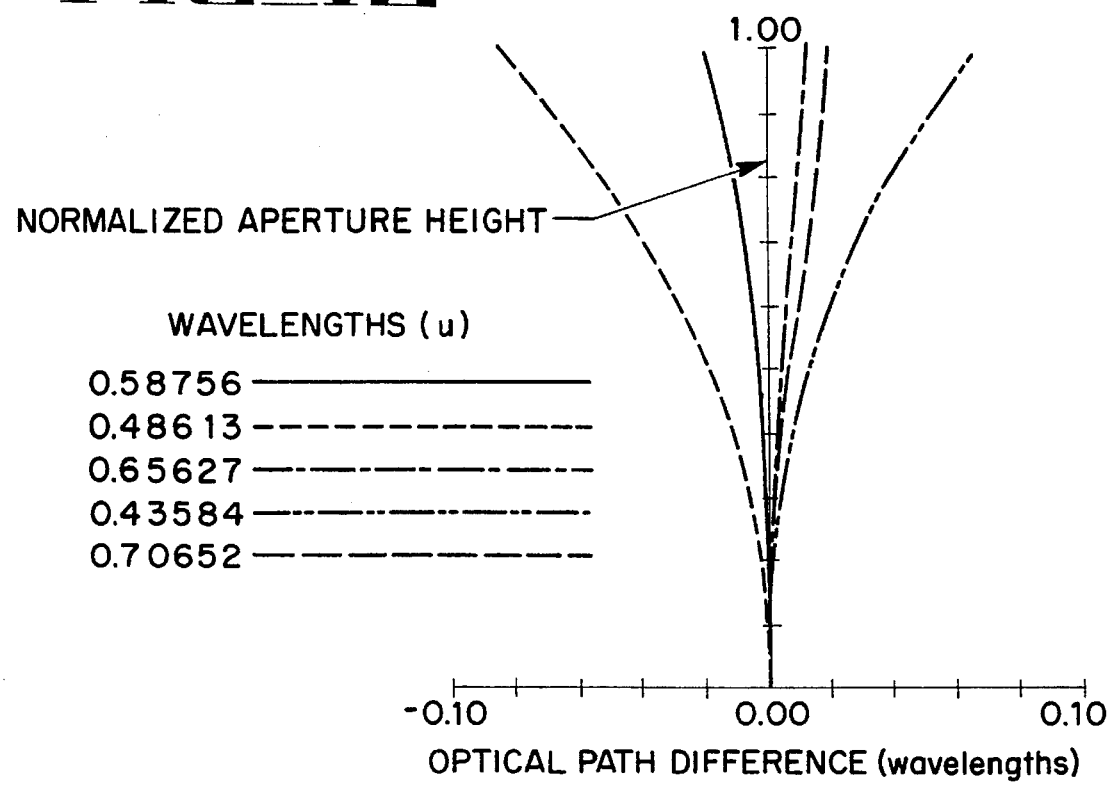
FIG_12
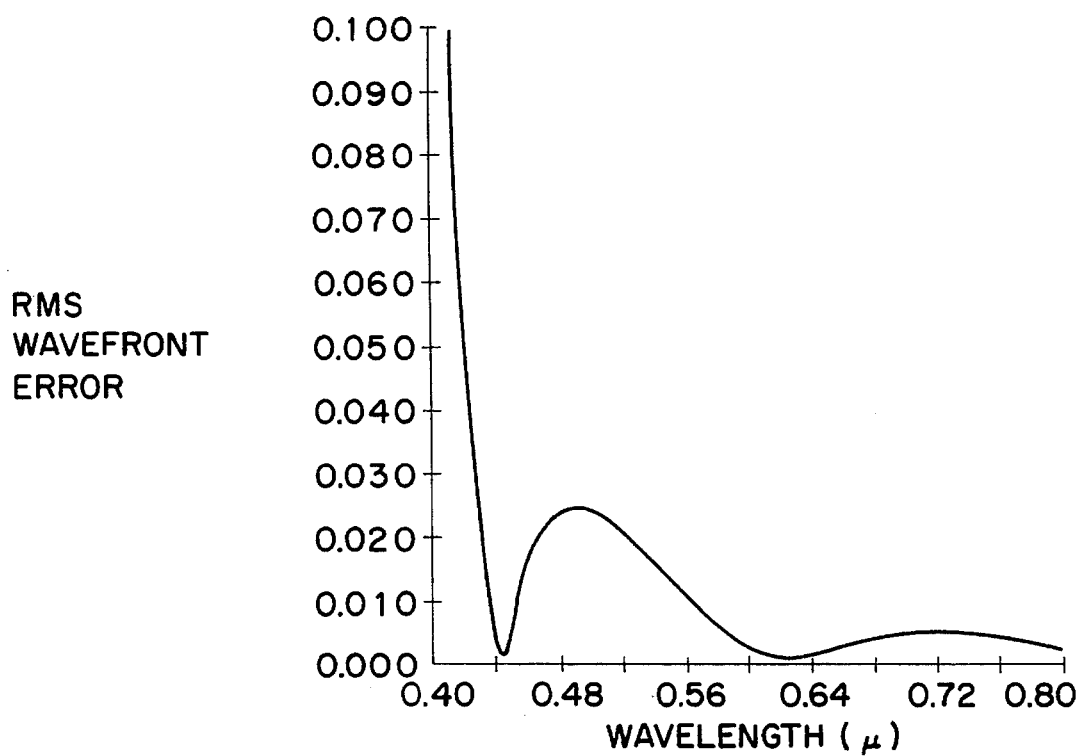
FIG 13

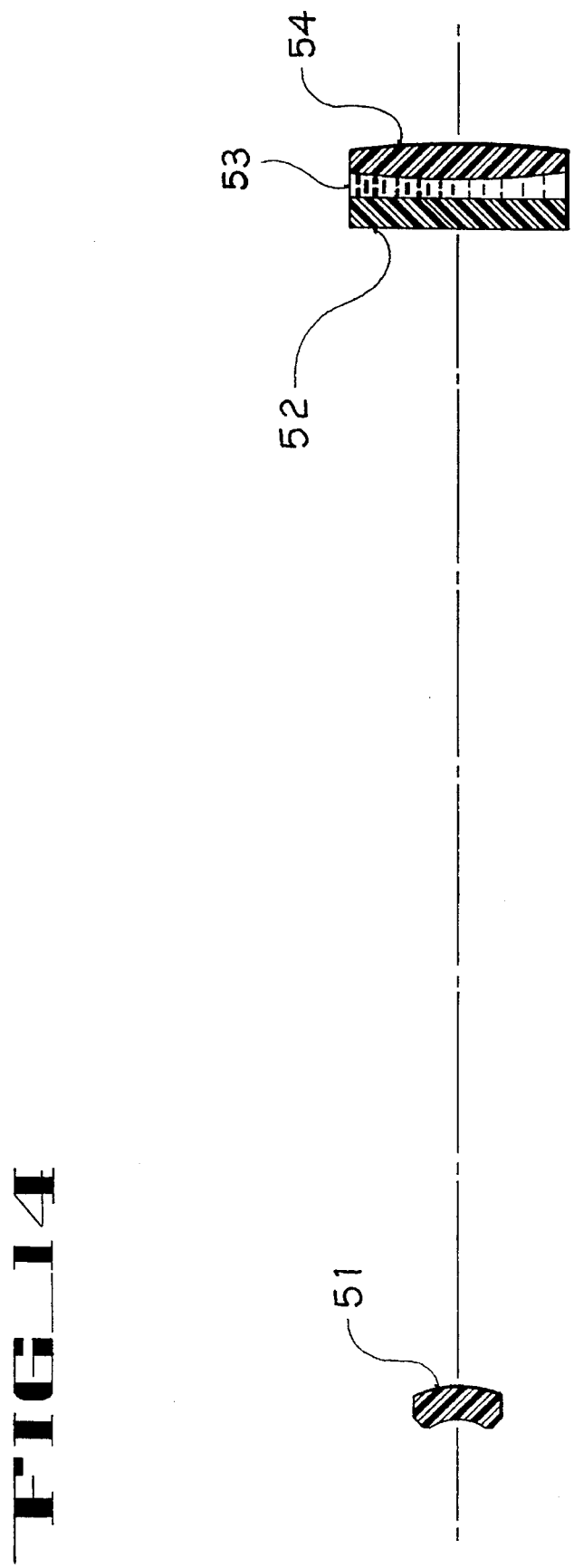

FIG_15
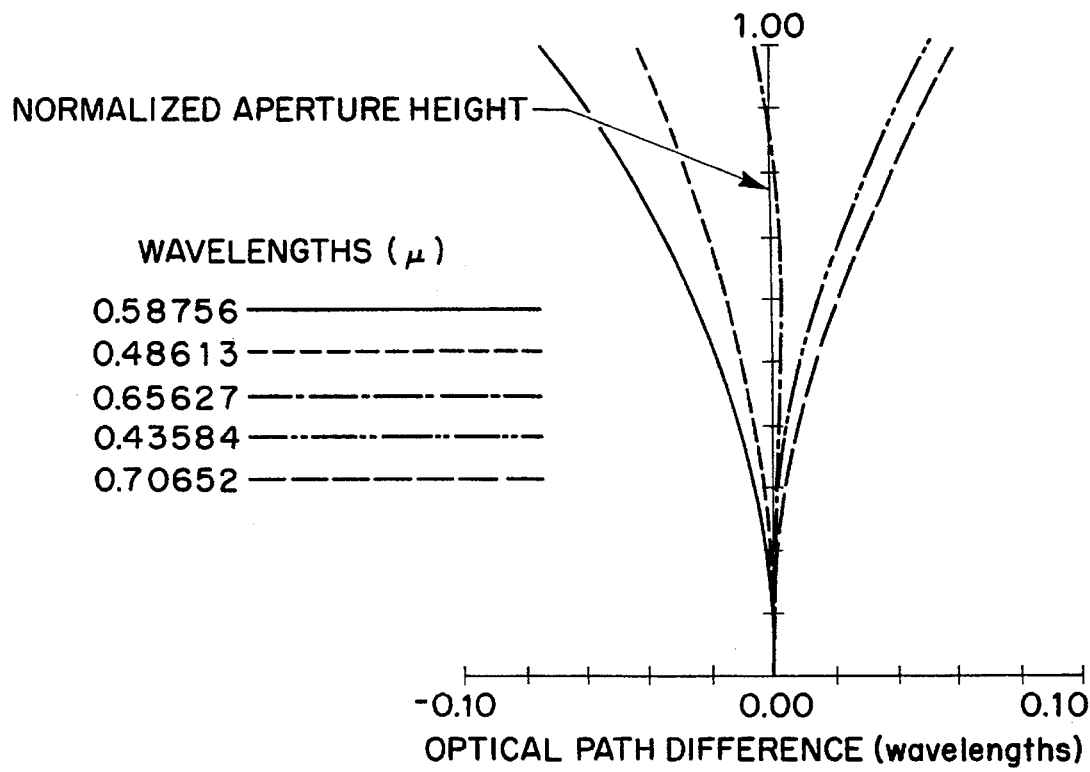
FIG_16
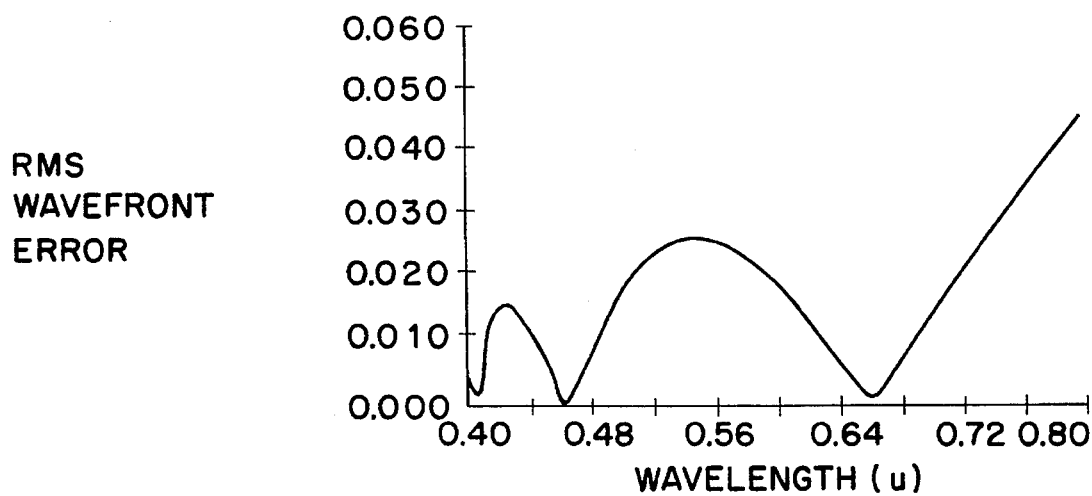

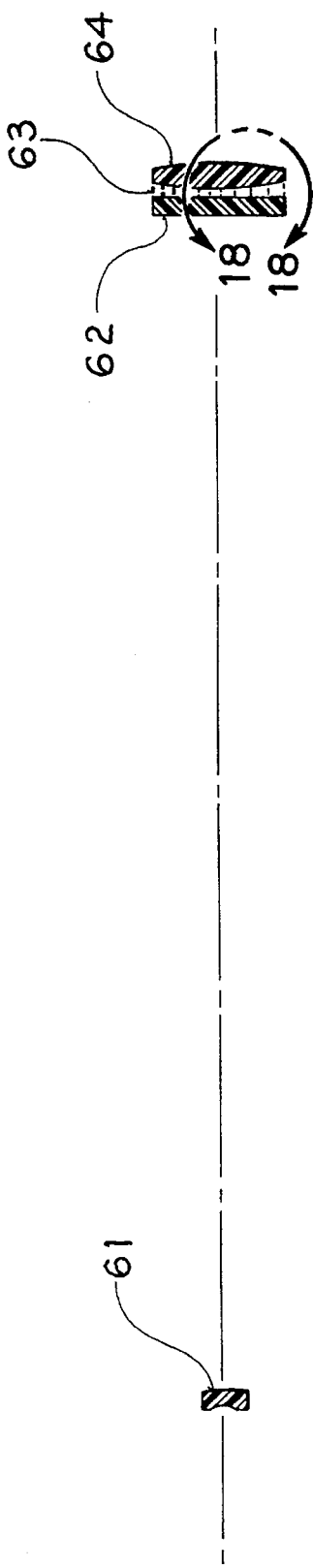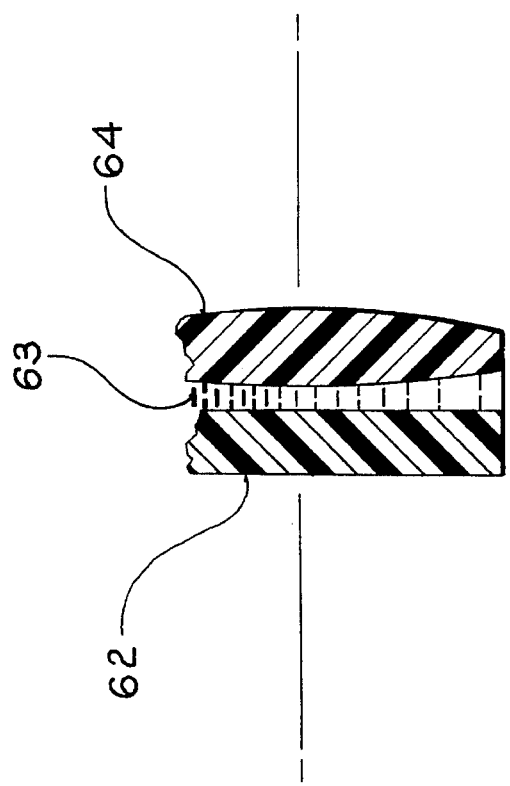

FIG_19
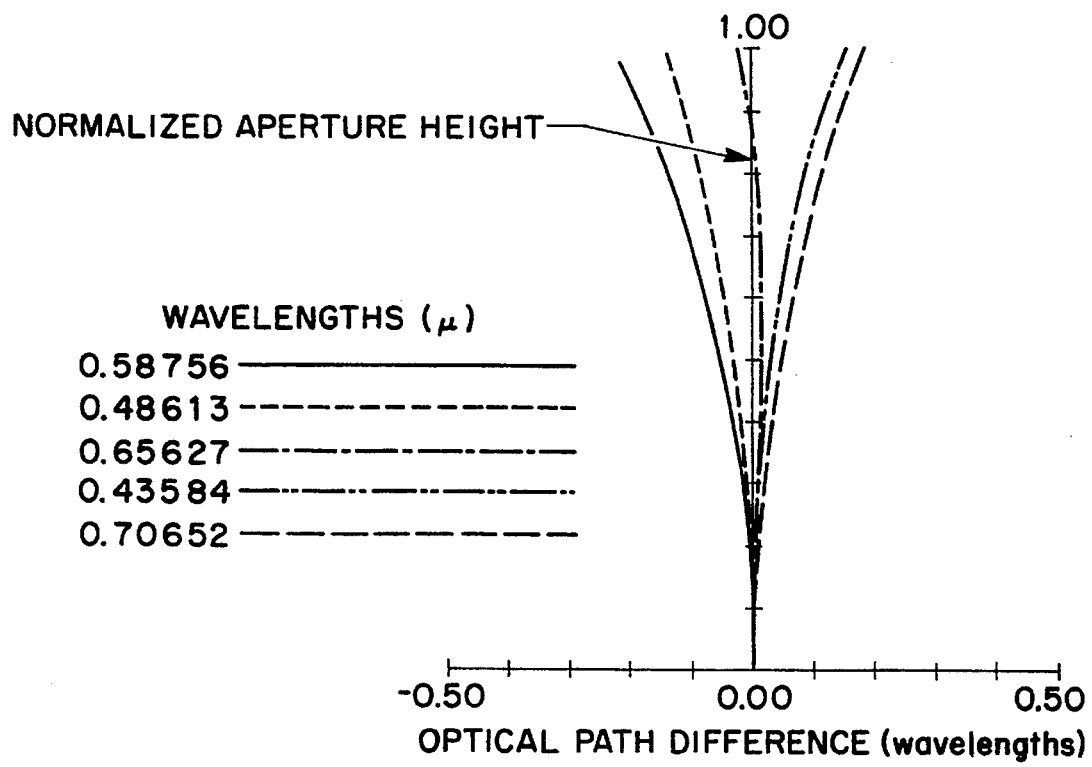
FIG_20
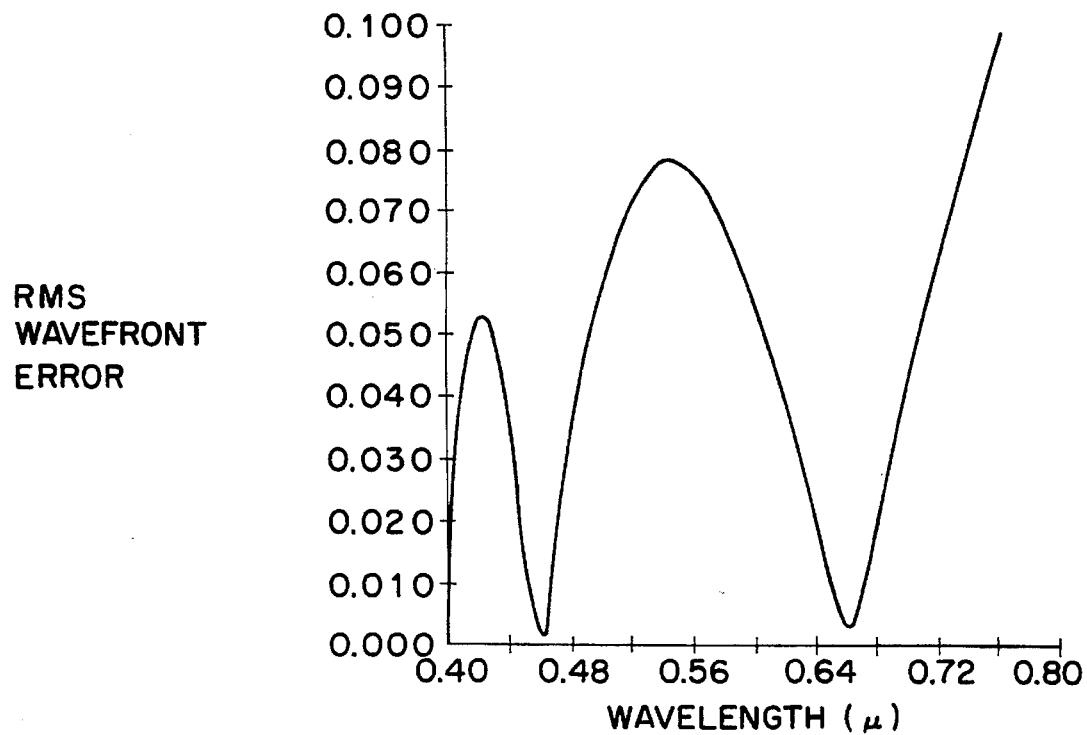

5,453,878

LASER BEAM EXPANDERS WITH PLASTIC AND LIQUID LENS ELEMENTS

This application is a division of Ser. No. 08/011,551, filed Feb. 1, 1993, now U.S. Pat. No. 5,373,396.

TECHNICAL FIELD

This invention relates generally to laser beam expanders, and more particularly to high-performance laser beam expanders whose lens elements are made of plastic and liquid optical materials.

BACKGROUND ART

The lens elements of laser beam expanders are ordinarily made of optical glasses. In general, optical glasses are considerably more expensive than optical-quality plastic and liquid materials.

A need has been recognized in the optical industry for reducing the cost of laser beam expanders. However, until the present invention, design forms had not been available for high-performance laser beam expanders whose lens elements consist only of plastic and liquid lens elements.

SUMMARY OF THE INVENTION

It is an object of the present invention to provide design forms for laser beam expanders whose lens elements consist only of plastic and liquid lens elements.

It is a more particular object of the present invention to provide design forms for laser beam expanders that achieve substantially diffraction-limited performance over a broad wavelength band using only plastic and liquid lens elements.

It is a specific object of the present invention to provide design forms for laser beam expanders that comprise relatively inexpensive plastic and liquid lens elements, which can be used to provide substantially diffraction-limited performance without refocussing over a wavelength range from 0.4 micron to 0.8 micron.

The invention as disclosed herein includes exemplary embodiments of laser beam expanders in which polymethylmethacrylate, polystyrene and polycarbonate are used for the plastic lens elements, and in which specified optical-quality liquids of proprietary composition marketed by R. L. Cargille Laboratories of Cedar Grove, N.J. are used for the liquid lens elements.

DESCRIPTION OF THE DRAWING

FIG. 1 is a profile drawing of a 5X laser beam expander according to the present invention whose lens elements are made of polymethylmethacrylate and Cargille 479370 liquid.

FIG. 2 is a plot of normalized aperture height vs. optical path difference at five different wavelengths for the 5X laser beam expander of FIG. 1.

FIG. 3 is a plot of rms wavefront error vs. wavelength over the wavelength range from 0.4 micron to 0.8 micron for the 5X laser beam expander of FIG. 1.

FIG. 4 is a profile drawing of a 10X laser beam expander according to the present invention whose lens elements are made of polymethylmethacrylate and Cargille 479370 liquid.

FIG. 5 is a plot of normalized aperture height vs. optical path difference at five different wavelengths for the 10X laser beam expander of FIG. 4.

FIG. 6 is a plot of rms wavefront error vs. wavelength over the wavelength range from 0.4 micron to 0.8 micron for the 10X laser beam expander of FIG. 4.

FIG. 7 is a profile drawing of a 5X laser beam expander according to the present invention whose lens elements are made of polystyrene and Cargille 480437 liquid.

FIG. 8 is a plot of normalized aperture height vs. optical path difference at five different wavelengths for the 5X laser beam expander of FIG. 7.

FIG. 9 is a plot of rms wavefront error vs. wavelength over the wavelength range from 0.4 micron to 0.8 micron for the 5X laser beam expander of FIG. 7.

FIG. 10 is a profile drawing of a 10X laser beam expander according to the present invention whose lens elements are made of polystyrene and Cargille 480437 liquid.

FIG. 11 is an enlarged view of a portion of the 10X laser beam expander enclosed within line 11—11 of FIG. 10.

FIG. 12 is a plot of normalized aperture height vs. optical path difference at five different wavelengths for the 10X laser beam expander of FIG. 10.

FIG. 13 is a plot of rms wavefront error vs. wavelength over the wavelength range from 0.4 micron to 0.8 micron for the 10X laser beam expander of FIG. 10.

FIG. 14 is a profile drawing of a 5X laser beam expander according to the present invention with whose elements are made of polycarbonate and Cargille 676196 liquid.

FIG. 15 is a plot of normalized aperture height vs. optical path difference at five different wavelengths for the 5X laser beam expander of FIG. 14.

FIG. 16 is a plot of rms wavefront error vs. wavelength over the wavelength range from 0.4 micron to 0.8 micron for the 5X laser beam expander of FIG. 14.

FIG. 17 is a profile drawing of a 10X laser beam expander according to the present invention whose lens elements are made of polycarbonate and Cargille 676196 liquid.

FIG. 18 is an enlarged view of a portion of the 10X laser beam expander enclosed within line 18—18 of FIG. 17.

FIG. 19 is a plot of normalized aperture height vs. optical path difference at five different wavelengths for the 10X laser beam expander of FIG. 17.

FIG. 20 is a plot of RMS wavefront error vs. wavelength over the wavelength range from 0.4 micron to 0.8 micron for the 10X laser beam expander of FIG. 17.

BEST MODE OF CARRYING OUT THE INVENTION

In FIG. 1, a 5X laser beam expander according to the present invention is illustrated in which four lens elements 11, 12, 13, and 14 are coaxially disposed along an optic axis. The first lens element 11 is made of optical-quality polymethylmethacrylate (also called "acrylic"), which is commercially obtainable from suppliers such as U.S. Precision Lens, Inc. of Cincinnati, Ohio. The second lens element 12 is likewise made of polymethylmethacrylate. The third lens element 13 consists of an optical liquid of proprietary composition, which is marketed by R. L. Cargille Laboratories of Cedar Grove, N.J. The fourth lens element 14 is made of polymethylmethacrylate.

The lens elements 11, 12, 13, and 14 can be mounted in a conventional manner. An effective technique for containing the liquid lens element 13 between the rigid lens elements 12 and 14 made of polymethylmethacrylate is described in co-pending U.S. patent application Ser. No.

07/941,299 filed on Sep. 4, 1992.

The Cargille liquid of which the lens element 13 is made is a siloxane of proprietary composition, which is marketed primarily as a laser liquid. This particular Cargille liquid can be uniquely identified according to the U.S. Mil-Spec system by code number 479370, which indicates a liquid whose index of refraction at the wavelength of the sodium d spectral line (i.e., 0.58756 micron ) at a temperature of 25° C. has the value 1.479 to the third decimal place, and whose Abbe number has the value 37.0 to the first decimal place. The optical properties of polymethylmethacrylate (i.e., acrylic) are well known. Index-of-refraction measurements for polymethylmethacrylate over a broad wavelength band are listed in an article by R. M. Altman and J. D. Lytle entitled "Optical Design Techniques for Polymer Optics", 1980 *International Lens Design Conference Proceedings*, SPIE, Vol. 237, page 380.

Cargille 479370 liquid has a density of approximately 1.013 gm/cc; and polymethylmethacrylate has a density of approximately 1.19 gm/cc. By way of comparison, the densities of most optical glasses are in the range from 2.5 gm/cc to 5.0 gm/cc. In general, refractive elements made of plastics and liquids are significantly lighter in weight than refractive elements made of optical glasses.

The laser beam expander illustrated in FIG. 1 was specifically designed to expand an input laser beam from a diameter of 2 mm to a diameter of 10 mm (i.e., to produce a 5X expansion) without requiring refocussing anywhere in the spectral range from 0.4 micron to 0.8 micron. The design form of the laser beam expander of FIG. 1 provides diffraction-limited performance over that spectral range, and chromatic aberration is virtually absent in the expanded beam.

The 5X laser beam expander of FIG. 1 has an optical prescription, which is specified in tabular format as follows:

TABLE I

| Surface No. | Radius (mm) | Thickness (mm) | $N_d$ | $V_d$ | Material |
| --- | --- | --- | --- | --- | --- |
| 1 | −6.8628 | 3.0000 | 1.491757 | 57.455 | Acrylic |
| 2 | −14.1495 | 114.7343 | | | Air |
| 3 | −226.9391 | 3.0000 | 1.491757 | 57.455 | Acrylic |
| 4 | −55.4824 | 1.0000 | 1.480110 | 37.080 | 479370 |
| 5 | 392.1598 | 3.0000 | 1.491757 | 57.455 | Acrylic |
| 6 | −59.7645 | 10.0000 | | | Air | where the surfaces of the lens elements are numbered consecutively from left to right along an optic axis in accordance with optical design convention. Thus, surfaces No. 1 and No. 2 are the left and right surfaces, respectively, of the polymethylmethacrylate (i.e., acrylic) lens element 11. Surface No. 3 is the left surface of the polymethylmethacrylate lens element 12. Surface No. 4 is both the right surface of the polymethylmethacrylate lens element 12, and the left surface of the liquid lens element 13. Surface No. 5 is both the right surface of the liquid lens element 13, and the left surface of the polymethylmethacrylate lens element 14. Surface No. 6 is the right surface of the polymethylmethacrylate lens element 14.

The radius listed for each lens surface in Table I is the radius of curvature expressed in millimeters. In accordance with optical design convention, the radius of curvature of a lens surface is positive if the center of curvature of the surface lies to the right of the surface, and negative if the center of curvature of the surface lies to the left of the surface. The thickness listed for each lens surface is the thickness expressed in millimeters of the lens element bounded on the left by the surface. The thickness of each lens element of the laser beam expander shown in FIG. 1 is measured along the optic axis.

The column headed $N_d$ in Table I refers to the index of refraction of the lens element bounded on the left by the indicated surface at the wavelength of the sodium d spectral line (i.e., 0.58756 micron). The column headed $V_d$ refers to the Abbe number for the lens element bounded on the left by the indicated surface. The material listed for each surface in Table I refers to the type of material bounded on the left by the indicated surface.

The index of refraction of an optical material varies with wavelength. The indices of refraction for the two different materials comprising the lens elements of the laser beam expander of FIG. 1 at five representative wavelengths in the range from 0.435 micron to 0.706 micron (i.e., $N_1$ at 0.58756 micron; $N_2$ at 0.48613 micron; $N_3$ at 0.65627 micron; $N_4$ at 0.43584 micron; and $N_5$ at 0.70652 micron) are tabulated as follows:

TABLE II

| Material | $N_1$ | $N_2$ | $N_3$ | $N_4$ | $N_5$ |
| --- | --- | --- | --- | --- | --- |
| Acrylic | 1.491757 | 1.497760 | 1.489201 | 1.502557 | 1.487781 |
| 479370 | 1.480110 | 1.489225 | 1.476227 | 1.496483 | 1.474177 |

It is instructive to evaluate the performance of the 5X laser beam expander shown in FIG. 1 at each of the above-specified wavelengths. A graphical indication of performance of a lens system at a particular wavelength is provided by a plot of normalized aperture height as a function of optical path difference for that wavelength. In FIG. 2, plots of normalized aperture height as a function of optical path difference are shown for the five wavelengths for which the indices of refraction are specified in Table II. It is apparent from FIG. 2 that the maximum wavefront error for any one of the five plotted wavelengths is less than $\lambda/65$ for the 5X laser beam expander shown in FIG. 1.

The optical path difference (OPD) error of an optical system at a particular wavelength is defined as the difference between the optical path length of a ray traced through a particular location in the entrance pupil of the system at a specified field angle and the optical path length of a reference ray, where the reference ray is usually taken to be the "chief ray" or "principal ray" traced through the center of the pupil at the specified field angle. The wavefront error of an optical system at a particular field angle is calculated as the statistical root-mean-square (RMS) of the optical path differences of a number of rays traced through the system at a single wavelength. A grid of equally spaced rays is generally used; and statistics are accumulated with respect to the point in the image plane where the RMS wavefront error is a minimum for the particular field angle and wavelength.

FIG. 3 is a plot of root-mean-square (RMS) wavefront error versus wavelength for rays entering the 5X laser beam expander of FIG. 1 parallel to the optic axis (i.e., at a field angle of zero) calculated over the wavelength range from 0.4 micron to 0.8 micron. It is apparent from FIG. 3 that the RMS wavefront error of the 5X laser beam expander of FIG. 1 is less than $\lambda/50$ (i.e., less than 0.002 of a wave) between the wavelengths of 0.4 micron and 0.8 micron. The average RMS wavefront error over this wavelength range for the laser beam expander of FIG. 1 is $\lambda/222$.

In FIG. 4, an alternative embodiment of a laser beam expander according to the present invention is illustrated in which the lens elements are likewise made of polymethylmethacrylate and Cargille 479370 liquid. The laser beam expander of FIG. 4 was specifically designed to expand an input laser beam from a diameter of 2 mm to a diameter of 20 mm (i.e., to provide a 10X expansion) with diffraction-limited performance without requiring refocussing anywhere in the spectral range from 0.4 micron to 0.8 micron.

The 10X laser beam expander of FIG. 4 comprises four lens elements 21, 22, 23, and 24, which are coaxially disposed along an optic axis. The first lens element 21 is made of polymethylmethacrylate (i.e., acrylic). The second lens element 22 is likewise made of polymethylmethacrylate. The third lens element 23 consists of Cargille 479370 liquid; and the fourth lens element 24 is made of polymethylmethacrylate.

The 10X laser beam expander of FIG. 4 has an optical prescription, which is specified in tabular format as follows:

TABLE III

| Surface No. | Radius (mm) | Thickness (mm) | $N_d$ | $V_d$ | Material |
| --- | --- | --- | --- | --- | --- |
| 1 | −2.8390 | 3.0000 | 1.491757 | 57.455 | Acrylic |
| 2 | −6.3701 | 120.0000 | | | Air |
| 3 | −1175.9144 | 3.0000 | 1.491757 | 57.455 | Acrylic |
| 4 | −43.4991 | 1.0000 | 1.480110 | 37.080 | 479370 |
| 5 | 481.8914 | 3.0000 | 1.491757 | 57.455 | Acrylic |
| 6 | −69.7898 | 10.0000 | | | Air | where the surfaces of the lens elements are numbered consecutively from left to right along the optic axis according to the same convention as described above in connection with Table I. The radii of curvature, axial thicknesses, and the values of $N_d$ and $V_d$, are specified in the same manner as in Table I.

In FIG. 5, performance of the 10X laser beam expander of FIG. 4 is illustrated by plots of normalized aperture height as a function of optical path difference for the same five wavelengths for which the indices of refraction are specified in Table II. It is apparent from FIG. 5 that the maximum wavefront error of the 10X laser beam expander of FIG. 4 for any one of the five plotted wavelengths is less than $\lambda/10.3$.

FIG. 6 is a plot of RMS wavefront error vs. wavelength for rays entering the 10X laser beam expander of FIG. 4 parallel to the optic axis (i.e., at a field angle of zero) calculated over the wavelength range from 0.4 micron to 0.8 micron. It is apparent from FIG. 6 that the wavefront error of the 10X laser beam expander of FIG. 4 is less than $\lambda/10.9$ (i.e., less than 0.092 of a wave) between the wavelengths of 0.4 micron and 0.8 micron. The average RMS wavefront error over this wavelength range for the laser beam expander of FIG. 4 is $\lambda/37.9$.

In FIG. 7, a 5X laser beam expander according to the present invention is illustrated whose lens elements consist of polystyrene and Cargille 480437 liquid. Optical-quality polystyrene is obtainable from suppliers such as U.S. Precision Lens, Inc. of Cincinnati, Ohio. Index-of-refraction measurements for polystyrene over a broad wavelength band are listed in the aforementioned article by R. M. Altman and J. D. Lytle entitled "Optical Design Techniques for Polymer Optics". Polystyrene has a density of approximately 1.06 gm/cc; and Cargille 480437 liquid has a density of approximately 1.013 gm/cc. Thus, refractive elements made of polystyrene and a Cargille liquid are significantly lighter in weight than refractive elements made of optical glasses.

The 5X laser beam expander of FIG. 7 comprises four lens elements 31, 32, 33, and 34, which are coaxially disposed with respect to each other along an optic axis. The first lens element 31 is made of polystyrene. The second lens element 32 is likewise made of polystyrene. The third lens element 33 consists of Cargille 480437 liquid; and the fourth lens element 34 is made of polystyrene.

The 5X laser beam expander of FIG. 7 has an optical prescription, which is specified in tabular format as follows:

TABLE IV

| Surface No. | Radius (mm) | Thickness (mm) | $N_d$ | $V_d$ | Material |
| --- | --- | --- | --- | --- | --- |
| 1 | −8.6405 | 3.0000 | 1.590481 | 30.866 | Polystyrene |
| 2 | −15.3841 | 145.6490 | | | Air |
| 3 | −245.7646 | 3.0000 | 1.590481 | 30.866 | Polystyrene |
| 4 | 82.1563 | 2.0000 | 1.480097 | 43.770 | 480437 |
| 5 | −54.4036 | 3.0000 | 1.590481 | 30.866 | Polystyrene |
| 6 | −55.7738 | 10.0000 | | | Air | where the surfaces of the lens elements are numbered consecutively from left to right along the optic axis according to the same convention as described above in connection with Table I. The radii of curvature, axial thicknesses, and the values of $N_d$ and $V_d$, are specified in the same manner as in Table I.

The indices of refraction for the two different materials comprising the lens elements of the 5X laser beam expander of FIG. 7 at the same five wavelengths for which the indices of refraction are specified in Table II are tabulated as follows:

TABLE V

| Material | $N_1$ | $N_2$ | $N_3$ | $N_4$ | $N_5$ |
| --- | --- | --- | --- | --- | --- |
| Polystyrene | 1.590481 | 1.604079 | 1.584949 | 1.615446 | 1.581954 |
| 480437 | 1.480097 | 1.487885 | 1.476917 | 1.494297 | 1.475199 |

In FIG. 8, performance of the 5X laser beam expander of FIG. 7 is illustrated by plots of normalized aperture height as a function of optical path difference for the five wavelengths for which the indices of refraction are specified in Table V. It is apparent from FIG. 8 that the maximum wavefront error of the 5X laser beam expander shown in FIG. 7 for any one of the five plotted wavelengths is less than $\lambda/37.6$.

FIG. 9 is a plot of RMS wavefront error vs. wavelength for rays entering the 5X laser beam expander of FIG. 7 parallel to the optic axis (i.e., at a field angle of zero) calculated over the wavelength range from 0.4 micron to 0.8 micron. It is apparent from FIG. 9 that the wavefront error of the 5X laser beam expander of FIG. 7 is less than $\lambda/18$ (i.e., less than 0.055 of a wave) between the wavelengths of 0.4 micron and 0.8 micron. The average RMS wavefront error over this wavelength range for the laser beam expander of FIG. 7 is $\lambda/191$.

In FIG. 10, an alternative embodiment of a laser beam expander according to the present invention, whose lens elements consist of polystyrene and Cargille 480437 liquid, is illustrated. The laser beam expander of FIG. 10 provides a 10X expansion with substantially diffraction-limited performance without requiring refocussing anywhere in the spectral range from 0.4 micron to 0.8 micron.

The 10X laser beam expander of FIG. 10 comprises four lens elements 41, 42, 43, and 44, which are coaxially disposed with respect to each other along an optic axis. The first lens element 41 is made of polystyrene. The second lens element 42 is likewise made of polystyrene. The third lens element 43 consists of Cargille 480437 liquid; and the fourth lens element 44 is made of polystyrene.

In FIG. 11, portions of the lens elements 42, 43, and 44 are shown in expanded view to illustrate the liquid lens element 43 contained between the plastic (i.e., polystyrene)lens elements 42 and 44.

The 10X laser beam expander of FIG. 10 has an optical prescription, which is specified in tabular format as follows:

TABLE VI

| Surface No. | Radius (mm) | Thickness (mm) | $N_d$ | $V_d$ | Material |
|---|---|---|---|---|---|
| 1 | −7.2143 | 3.0000 | 1.590481 | 30.886 | Polystyrene |
| 2 | −13.5442 | 272.3082 | | | Air |
| 3 | −765.9110 | 3.0000 | 1.590481 | 30.886 | Polystyrene |
| 4 | 135.8858 | 2.0000 | 1.480097 | 43.770 | 480437 |
| 5 | −75.0698 | 3.0000 | 1.590481 | 30.886 | Polystyrene |
| 6 | −95.8958 | 10.0000 | | | Air | where the surfaces of the lens elements are numbered consecutively from left to right along the optic axis according to the same convention as described above in connection with Table I. The radii of curvature, axial thicknesses, and the values of $N_d$ and $V_d$, are specified in the same manner as in Table I.

In FIG. 12, performance of the 10X laser beam expander of FIG. 10 is illustrated by plots of normalized aperture height as a function of optical path difference for the same five wavelengths for which the indices of refraction are specified in Tables II and V. It is apparent from FIG. 12 that the maximum wavefront error of the 10X laser beam expander of FIG. 10 for any one of the five plotted wavelengths is less than $\lambda/11.6$.

FIG. 13 is a plot of RMS wavefront error vs. wavelength for rays entering the 10X laser beam expander of FIG. 10 parallel to the optic axis (i.e., at a field angle of zero) calculated over the wavelength range from 0.4 micron to 0.8 micron. It is apparent from FIG. 13 that the wavefront error of the 10X laser beam expander of FIG. 10 is less than $\lambda/5.7$ (i.e., less than 0.176 of a wave) between the wavelengths of 0.4 micron and 0.8 micron. The average RMS wavefront error over this wavelength range for the laser beam expander of FIG. 10 is $\lambda/56$.

In FIG. 14, a 5X laser beam expander according to the present invention is illustrated whose lens elements consist of polycarbonate and Cargille 676196 liquid. Optical-quality polycarbonate is obtainable from suppliers such as U.S. Precision Lens, Inc. of Cincinnati, Ohio. Index-of-refraction measurements for polycarbonate over a broad wavelength band are listed in the aforementioned article by R. M. Altman and J. D. Lytle entitled "Optical Design Techniques for Polymer Optics". Polycarbonate has a density of approximately 1.20 gm/cc; and Cargille 676196 liquid has a density of approximately 1.593 gm/cc. Thus, refractive elements made of polycarbonate and a Cargille liquid are significantly lighter in weight than refractive elements made of optical glasses.

The 5X laser beam expander of FIG. 14 comprises four lens elements 51, 52, 53, and 54, which are coaxially disposed with respect to each other along an optic axis. The first lens element 51 is made of polycarbonate. The second lens element 52 is likewise made of polycarbonate. The third lens element 53 consists of Cargille 676196 liquid; and the fourth lens element 54 is made of polycarbonate.

The 5X laser beam expander of FIG. 14 has an optical prescription that is specified in tabular format as follows:

TABLE VII

| Surface No. | Radius (mm) | Thickness (mm) | $N_d$ | $V_d$ | Material |
|---|---|---|---|---|---|
| 1 | −11.4624 | 3.0000 | 1.585470 | 29.909 | Polycarbonate |
| 2 | −25.0349 | 145.0000 | | | Air |
| 3 | −195.4749 | 3.0000 | 1.585470 | 29.909 | Polycarbonate |
| 4 | −4643.6103 | 1.0000 | 1.676295 | 19.644 | 676196 |
| 5 | 85.3339 | 3.0000 | 1.585470 | 29.909 | Polycarbonate |
| 6 | −64.5436 | 10.0000 | | | Air | where the surfaces of the lens elements are numbered consecutively from left to right along the optic axis according to the same convention as described above in connection with Table I. The radii of curvature, axial thicknesses, and the values of $N_d$ and $V_d$, are specified in the same manner as in Table I.

The indices of refraction for the two different materials comprising the lens elements of the 5X laser beam expander of FIG. 14 at the same five wavelengths for which the indices of refraction are specified in Tables II and V are tabulated as follows:

TABLE VIII

| Material | $N_1$ | $N_2$ | $N_3$ | $N_4$ | $N_5$ |
|---|---|---|---|---|---|
| Polycarbonate | 1.585470 | 1.599439 | 1.579864 | 1.611519 | 1.576832 |
| 676196 | 1.676295 | 1.701134 | 1.666706 | 1.722817 | 1.661679 |

In FIG. 15, performance of the 5X laser beam expander of FIG. 14 is illustrated by plots of normalized aperture height as a function of optical path difference for the five wavelengths for which the indices of refraction are specified in Table VIII. It is apparent from FIG. 15 that the maximum wavefront error of the 5X laser beam expander of FIG. 14 for any one of the five plotted wavelengths is less than $\lambda/58$.

FIG. 16 is a plot of RMS wavefront error vs. wavelength for rays entering the 5X laser beam expander of FIG. 14 parallel to the optic axis (i.e., at a field angle of zero) calculated over the wavelength range from 0.4 micron to 0.8 micron. It is apparent from FIG. 16 that the wavefront error of the 5X laser beam expander of FIG. 14 is less than $\lambda/21$ (i.e., less than 0.048 of a wave) between the wavelengths of 0.4 micron and 0.8 micron. The average RMS wavefront error over this wavelength range for the laser beam expander of FIG. 14 is $\lambda/152.6$.

In FIG. 17, an alternative embodiment of a laser beam expander according to the present invention, whose lens elements consist of polycarbonate and Cargille 676196 liquid, is illustrated. The laser beam expander of FIG. 17 expands an input laser beam from a diameter of 2 mm to a diameter of 20 mm (i.e., provides a 10X expansion) with substantially diffraction-limited performance without requiring refocussing anywhere in the spectral range from 0.4 micron to 0.8 micron.

The 10X laser beam expander of FIG. 17 comprises four lens elements 61, 62, 63, and 64, which are coaxially disposed with respect to each other along an optic axis. The first lens element 61 is made of polycarbonate. The second lens element 62 is likewise made of polycarbonate. The third lens element 63 consists of Cargille 676196 liquid; and the fourth lens element 64 is made of polycarbonate.

In FIG. 18, portions of the lens elements 62, 63, and 64 are shown in expanded view to illustrate the liquid lens element 63 contained between the plastic (i.e., polycarbonate) lens elements 62 and 64.

The 10X laser beam expander of FIG. 17 has an optical prescription, which is specified in tabular format as follows:

TABLE IX

| Surface No. | Radius (mm) | Thickness (mm) | $N_d$ | $V_d$ | Material |
|---|---|---|---|---|---|
| 1 | −10.9087 | 3.0000 | 1.585470 | 29.909 | Polycarbonate |
| 2 | −28.9858 | 272.3082 | | | Air |
| 3 | −504.7294 | 3.0000 | 1.585470 | 29.909 | Polycarbonate |
| 4 | −1032.8888 | 2.0000 | 1.676295 | 19.644 | 676196 |
| 5 | 140.0307 | 3.0000 | 1.585470 | 29.909 | Polycarbonate |
| 6 | −116.0882 | 10.0000 | | | Air | where the surfaces of the lens elements are numbered consecutively from left to right along the optic axis according to the same convention as described above in connection with Table I. The radii of curvature, axial thicknesses, and the values of $N_d$ and $V_d$, are specified in the same manner as in Table I.

In FIG. 19, performance of the 10X laser beam expander of FIG. 17 is illustrated by plots of normalized aperture height as a function of optical path difference for the same five wavelengths for which the indices of refraction are specified in Tables II, V and VIII. It is apparent from FIG. 19 that the maximum wavefront error of the 10X laser beam expander of FIG. 17 for any one of the five plotted wavelengths is less than $\lambda/4.7$.

FIG. 20 is a plot of RMS wavefront error vs. wavelength for rays entering the 10X laser beam expander of FIG. 17 parallel to the optic axis (i.e., at a field angle of zero) calculated over the wavelength range from 0.4 micron to 0.8 micron. It is apparent from FIG. 20 that the wavefront error of the 10X laser beam expander of FIG. 17 is less than $\lambda/7.5$ (i.e., less than 0.133 of a wave) between the wavelengths of 0.4 micron and 0.8 micron. The average RMS wavefront error over this wavelength range for the laser beam expander of FIG. 17 is $\lambda/18.3$.

The present invention has been described above in terms of certain exemplary design forms, which were developed for particular applications. However, practitioners skilled in the art of optical design could readily develop different design forms for laser beam expanders intended for other applications by changing parametric values of the exemplary design forms and still be within the scope of the invention. Therefore, the present invention is defined more generally by the following claims and their equivalents.

I claim:

1. An afocal lens system having substantially diffraction-limited performance over a pre-determined wavelength range in the visible and near infrared regions of the electromagnetic spectrum, said lens system comprising a lens set; and a first lens element;

said lens set including a lens element made of a Cargille 479370 liquid optical element and a pair of lens elements; the first lens element and pair of lens elements made of acrylic;

each element of said lens set and said first lens element being positioned with respect to each other along an optic axis;

said first lens element being spaced a pre-determined distance apart from said lens set;

said liquid lens element being disposed between said pair of lens elements;

said lens elements being configured and positioned with respect to each other along said optic axis according to a design form specified as follows:

| Surface No. | Radius (mm) | Thickness (mm) | $N_d$ | $V_d$ | Material |
|---|---|---|---|---|---|
| 1 | −6.8628 | 3.0000 | 1.491757 | 57.455 | Acrylic |
| 2 | −14.1495 | 114.7343 | | | Air |
| 3 | −226.9391 | 3.0000 | 1.491757 | 57.455 | Acrylic |
| 4 | −55.4824 | 1.0000 | 1.480110 | 37.080 | 479370 |
| 5 | 392.1598 | 3.0000 | 1.491757 | 57.455 | Acrylic |
| 6 | −59.7645 | 10.0000 | | | Air | where the surfaces of the lens elements are numbered consecutively from left to right along the optic axis, and where $N_d$ is the index of refraction at the wavelength of the sodium d spectral line and $V_d$ is the Abbe number at the same wavelength.

2. An afocal lens system having substantially diffraction-limited performance over a pre-determined wavelength range in the visible and near infrared regions of the electromagnetic spectrum, said lens system comprising a lens set; and a first lens element;

said lens set including a lens element made of a Cargille 479370 liquid optical element and a pair of lens elements; the first lens element and pair of lens elements made of acrylic;

each element of said lens set and said first lens element being positioned with respect to each Other along an optic axis;

said first lens element being spaced a pre-determined distance apart from said lens set;

said liquid lens element being disposed between said pair of lens elements;

said lens elements being configured and positioned with respect to each other along said optic axis according to a design form specified as follows:

| Surface No. | Radius (mm) | Thickness (mm) | $N_d$ | $V_d$ | Material |
|---|---|---|---|---|---|
| 1 | −2.8390 | 3.0000 | 1.491757 | 57.455 | Acrylic |
| 2 | −6.3701 | 120.0000 | | | Air |
| 3 | −1175.9144 | 3.0000 | 1.491757 | 57.455 | Acrylic |
| 4 | −43.4991 | 1.0000 | 1.480110 | 37.080 | 479370 |
| 5 | 481.8914 | 3.0000 | 1.491757 | 57.455 | Acrylic |
| 6 | −69.7898 | 10.0000 | | | Air | where the surfaces of the lens elements are numbered consecutively from left to right along the optic axis, and where $N_d$ is the index of refraction at the wavelength of the sodium d spectral line and $V_d$ is the Abbe number at the same wavelength.

3. An afocal lens system having substantially diffraction-limited performance over a pre-determined wavelength range in the visible and near infrared regions of the electromagnetic spectrum, said lens system comprising a lens set; and a first lens element;

said lens set including a lens element made of a Cargille 480437 liquid optical element and a pair of lens elements; the first lens element and pair of lens elements made of polystyrene;

each element of said lens set and said first lens element being positioned with respect to each other along an optic axis;

said first lens element being spaced a pre-determined distance apart from said lens set;

said liquid lens element being disposed between said pair of lens elements;

said lens elements being configured and positioned with respect to each other along said optic axis according to a design form specified as follows:

| Surface No. | Radius (mm) | Thickness (mm) | $N_d$ | $V_d$ | Material |
|---|---|---|---|---|---|
| 1 | −8.6405 | 3.0000 | 1.590481 | 30.866 | Polystyrene |
| 2 | −15.3841 | 145.6490 | | | Air |
| 3 | −245.7646 | 3.0000 | 1.590481 | 30.866 | Polystyrene |
| 4 | 82.1563 | 2.0000 | 1.480097 | 43.770 | 480437 |
| 5 | −54.4036 | 3.0000 | 1.590481 | 30.866 | Polystyrene |
| 6 | −55.7738 | 10.0000 | | | Air | where the surfaces of the lens elements are numbered consecutively from left to right along the optic axis, and where $N_d$ is the index of refraction at the wavelength of the sodium d spectral line and $V_d$ is the Abbe number at the same wavelength.

4. An afocal lens system having substantially diffraction-limited performance over a pre-determined wavelength range in the visible and near infrared regions of the electromagnetic spectrum, said lens system comprising a lens set; and a first lens element;

said lens set including a lens element made of a Cargille 480437 liquid optical element and a pair of lens elements; the first lens element and pair of lens elements made of polystyrene;

each element of said lens set and said first lens element being positioned with respect to each other along an optic axis;

said first lens element being spaced a pre-determined distance apart from said lens set;

said liquid lens element being disposed between said pair of lens elements;

said lens elements being configured and positioned with respect to each other along said optic axis according to a design form specified as follows:

| Surface No. | Radius (mm) | Thickness (mm) | $N_d$ | $V_d$ | Material |
|---|---|---|---|---|---|
| 1 | −7.2143 | 3.0000 | 1.590481 | 30.886 | Polystyrene |
| 2 | −13.5442 | 272.3082 | | | Air |
| 3 | −765.9110 | 3.0000 | 1.590481 | 30.886 | Polystyrene |
| 4 | 135.8858 | 2.0000 | 1.480097 | 43.770 | 480437 |
| 5 | −75.0698 | 3.0000 | 1.590481 | 30.886 | Polystyrene |
| 6 | −95.8958 | 10.0000 | | | Air | where the surfaces of the lens elements are numbered consecutively from left to right along the optic axis, and where $N_d$ is the index of refraction at the wavelength of the sodium d spectral line and $V_d$ is the Abbe number at the same wavelength.

5. An afocal lens system having substantially diffraction-limited performance over a pre-determined wavelength range in the visible and near infrared regions of the electromagnetic spectrum, said lens system comprising a lens set; and a first lens element;

said lens set including a lens element made of a Cargille 676196 liquid optical element and a pair of lens elements; the first lens element and pair of lens elements made of polycarbonate;

each element of said lens set and said first lens element being positioned with respect to each other along an optic axis;

said first lens element being spaced a pre-determined distance apart from said lens set;

said liquid lens element being disposed between said pair of lens elements;

said lens elements being configured and positioned with respect to each other along said optic axis according to a design form specified as follows:

| Surface No. | Radius (mm) | Thickness (mm) | $N_d$ | $V_d$ | Material |
|---|---|---|---|---|---|
| 1 | −11.4624 | 3.0000 | 1.585470 | 29.909 | Polycarbonate |
| 2 | −25.0349 | 145.0000 | | | Air |
| 3 | −195.4749 | 3.0000 | 1.585470 | 29.909 | Polycarbonate |
| 4 | −4643.6103 | 1.0000 | 1.676295 | 19.644 | 676196 |
| 5 | 85.3339 | 3.0000 | 1.585470 | 29.909 | Polycarbonate |
| 6 | −64.5436 | 10.0000 | | | Air | where the surfaces of the lens elements are numbered consecutively from left to right along the optic axis, and where $N_d$ is the index of refraction at the wavelength of the sodium d spectral line and $V_d$ is the Abbe number at the same wavelength.

6. An afocal lens system having substantially diffraction-limited performance over a pre-determined wavelength range in the visible and near infrared regions of the electromagnetic spectrum, said lens system comprising a lens set; and a first lens element;

said lens set including a lens element made of a Cargille 676196 liquid optical element and a pair of lens elements; the first lens element and pair of lens elements made of polycarbonate;

each element of said lens set and said first lens element being positioned with respect to each other along an optic axis;

said first lens element being spaced a pre-determined distance apart from said lens set;

said liquid lens element being disposed between said pair of lens elements;

said lens elements being configured and positioned with respect to each other along said optic axis according to a design form specified as follows:

| Surface No. | Radius (mm) | Thickness (mm) | $N_d$ | $V_d$ | Material |
|---|---|---|---|---|---|
| 1 | −10.9087 | 3.0000 | 1.585470 | 29.909 | Polycarbonate |
| 2 | −28.9858 | 272.3082 | | | Air |
| 3 | −504.7294 | 3.0000 | 1.585470 | 29.909 | Polycarbonate |
| 4 | −1032.8888 | 2.0000 | 1.676295 | 19.644 | 676196 |
| 5 | 140.0307 | 3.0000 | 1.585470 | 29.909 | Polycarbonate |
| 6 | −116.0882 | 10.0000 | | | Air | where the surfaces of the lens elements are numbered consecutively from left to right along the optic axis, and where $N_d$ is the index of refraction at the wavelength of the sodium d spectral line and $V_d$ is the Abbe number at the same wavelength.

7. An afocal lens system having substantially diffraction-limited performance over a pre-determined wavelength range in the visible and near infrared regions of the electromagnetic spectrum, said lens system comprising a lens set; and a first lens element;

the lens set including a lens element made of a liquid optical element and a pair of lens elements; the first lens element and pair of lens elements made of a plastic optical material;

each element of said lens set and said first lens element being positioned with respect to each other along an optic axis;

said first lens element being spaced a pre-determined distance apart from said lens set;

said liquid lens element being disposed between said pair of lens elements, said pre-determined distance extending more than 110 millimeters.

8. The lens system of claim 7 wherein said plastic and liquid lens elements in combination enable laser beams of different wavelengths to be expanded, without refocussing, over a wavelength range from about 0.4 micron to 0.8 micron with substantially diffraction-limited performance.

9. The lens system of claim 7 wherein said plastic material is acrylic.

10. The lens system of claim 7 wherein said liquid is Cargille 479370 liquid.

11. The lens system of claim 7 wherein said plastic material is polystyrene.

12. The lens system of claim 7 wherein said liquid is Cargille 480437 liquid.

13. The lens system of claim 7 wherein said plastic material is polycarbonate.

14. The lens system of claim 7 wherein said liquid is Cargille 676196 1 liquid.

15. The lens system of claim 7 wherein each of said plastic and liquid optical materials has a density less than about 2 gm/cc.

16. The lens system of claim 7, said pre-determined wavelength range extending between 0.4 microns and 0.8 micron;

and wherein a static relation is maintained between said first lens element and said lens set.

17. A method for developing an afocal lens system having substantially diffraction-limited performance over a wavelength range from about 0.4 microns to 0.8 microns of the electromagnetic spectrum, said method including the steps of:

a) creating a lens assembly by
 i) forming a pair of lens elements with a plastic optical material;
 ii) establishing a volume bounded by said pair of lens elements along an optic axis; and,
 iii) filling said volume with a Cargille liquid along said optic axis, said liquid being optically compatible with said plastic material;

b) forming a first lens element with said plastic material; and c) positioning said first lens element a pre-determined distance apart from said lens assembly and along said optical axis; and producing said afocal lens system through which a beam of electromagnetic radiation within said wavelength range may be transmitted substantially diffraction effect-free and with a maximum wavefront error of less than lambda/10 wherein a static relation is maintained between said first lens element and said lens set.

18. The method of claim 17, further including the step of producing said afocal lens system with an average root-mean-squared wavefront error of less than lambda/18 by adjusting the shape of the lens set.

* * * * *